(12) United States Patent
Heo et al.

(10) Patent No.: US 9,942,914 B2
(45) Date of Patent: Apr. 10, 2018

(54) COMMUNICATION OF SECURITY KEY INFORMATION (71) Applicant: INTEL IP CORPORATION, Santa Clara, CA (US)

(72) Inventors: Youn Hyoung Heo, Seoul (KR); Yujian Zhang, Beijing (CN)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/070,461

(22) Filed: Mar. 15, 2016

(65) Prior Publication Data
US 2016/0198343 A1 Jul. 7, 2016

Related U.S. Application Data (63) Continuation of application No. 14/125,606, filed as application No. PCT/US2013/061518 on Sep. 25, 2013, now Pat. No. 9,313,802.
(Continued)

(51) Int. Cl.
H04K 1/00 (2006.01)
H04W 72/12 (2009.01)
(Continued)

(52) U.S. Cl.
CPC ........... *H04W 72/1263* (2013.01); *H04J 3/00* (2013.01); *H04L 5/0096* (2013.01); *H04L 5/22* (2013.01);
(Continued)

(58) Field of Classification Search
CPC . H04W 12/04; H04W 48/10; H04W 36/0066; H04W 72/046; H04W 4/06;
(Continued)

(56) References Cited

U.S. PATENT DOCUMENTS

2006/0242414 A1 10/2006 Corson et al.
2009/0086973 A1 4/2009 Buddhikot et al.
(Continued)

FOREIGN PATENT DOCUMENTS

KR 10-2008-0051456 6/2008

OTHER PUBLICATIONS

3GPP TS 36.300 V10.9.0 (Dec. 2012) Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

*Primary Examiner* — Mohammed Waliullah
(74) *Attorney, Agent, or Firm* — Thorpe North & Western (57) ABSTRACT Technology for communicating security key information from a macro eNB is disclosed. Security key information associated with the macro evolved node B (eNB) may be determined. The security key information may be used to cipher information communicated at the first eNB. A small eNB may be identified at the macro eNB to generate the security key information associated with the macro eNB for ciphering information communicated at the second eNB. The security key information may be communicated, from the macro eNB, to the small eNB for inter-Evolved Universal Terrestrial Radio Access (EUTRA) evolved node B (eNB) carrier aggregation.

11 Claims, 7 Drawing Sheets

Related U.S. Application Data (60) Provisional application No. 61/753,914, filed on Jan. 17, 2013.

(51) Int. Cl.
| | |
|---|---|
| *H04W 16/32* | (2009.01) |
| *H04W 48/16* | (2009.01) |
| *H04W 56/00* | (2009.01) |
| *H04L 5/22* | (2006.01) |
| *H04J 3/00* | (2006.01) |
| *H04W 28/02* | (2009.01) |
| *H04W 52/02* | (2009.01) |
| *H04W 12/04* | (2009.01) |
| *H04W 76/02* | (2009.01) |
| *H04W 24/02* | (2009.01) |
| *H04W 72/04* | (2009.01) |
| *H04W 76/04* | (2009.01) |
| *H04W 24/10* | (2009.01) |
| *H04W 88/06* | (2009.01) |
| *H04W 36/00* | (2009.01) |
| *H04W 48/10* | (2009.01) |
| *H04W 84/12* | (2009.01) |
| *H04L 5/00* | (2006.01) |

(52) U.S. Cl.
CPC ............ *H04W 12/04* (2013.01); *H04W 16/32* (2013.01); *H04W 24/02* (2013.01); *H04W 24/10* (2013.01); *H04W 28/0231* (2013.01); *H04W 36/0066* (2013.01); *H04W 48/10* (2013.01); *H04W 48/16* (2013.01); *H04W 52/0251* (2013.01); *H04W 56/001* (2013.01); *H04W 72/0413* (2013.01); *H04W 72/12* (2013.01); *H04W 72/1278* (2013.01); *H04W 76/021* (2013.01); *H04W 76/046* (2013.01); *H04W 88/06* (2013.01); *H04L 5/0092* (2013.01); *H04L 5/0094* (2013.01); *H04L 2209/80* (2013.01); *H04W 84/12* (2013.01); *Y02B 60/50* (2013.01)

(58) Field of Classification Search
CPC ...... H04W 88/06; H04L 43/08; H04L 5/0096; H04L 63/0428; H04L 1/1887; H04L 5/0055; H04L 5/14; H04L 9/14; H04L 5/1469; H04L 5/0062
See application file for complete search history.

(56) References Cited

U.S. PATENT DOCUMENTS

| | | | |
|---|---|---|---|
| 2009/0109933 A1* | 4/2009 | Murasawa | H04L 63/029 370/335 |
| 2012/0204027 A1 | 8/2012 | Baek et al. | |
| 2015/0016367 A1* | 1/2015 | Koskinen | H04L 5/001 370/329 |
| 2015/0055621 A1* | 2/2015 | Koskinen | H04W 36/18 370/331 |

* cited by examiner

COMMUNICATION OF SECURITY KEY INFORMATION

RELATED APPLICATIONS

This application is a continuation of U.S. patent application Ser. No. 14/125,606 filed Dec. 12, 2013 which claims priority to U.S. Provisional Patent Application No. 61/753,914, filed Jan. 17, 2013, the entire specifications of which are hereby incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

One technique for providing additional bandwidth capacity to wireless devices is through the use carrier aggregation of multiple smaller bandwidths to form a virtual wideband channel at a wireless device (e.g., UE). In carrier aggregation (CA), multiple component carriers (CC) can be aggregated and jointly used for transmission to/from a single terminal. Carrier aggregation provides a broader choice to the wireless devices, enabling more bandwidth to be obtained. The greater bandwidth can be used to communicate bandwidth intensive operations, such as streaming video or communicating large data files.

Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains. In addition, the downlink CC may include a primary cell and/or up to four secondary cells in carrier aggregation. Each serving cell (i.e., the primary cell and up to the four secondary cells) can be independently configured by radio resource control (RRC) signaling. In addition, the term "small cell" may refer to a "low power node."

A technique for providing additional bandwidth capacity to wireless devices may include using inter-Evolved Universal Terrestrial Radio Access (EUTRA) evolved node B (eNB) carrier aggregation (CA). While all serving cells are served by the same eNB in Third Generation Partnership Project (3GPP) Long Term Evolution (LTE) Release 11, the serving cells may be operated in different eNBs in inter-EUTRA eNB CA. For example, the primary cell (or PCell) may be served from a macro cell and the secondary cell (SCell) may be served from a pico cell. The macro cell may be associated with a macro eNB and the pico cell may be associated with a pico eNB.

Figure 1:
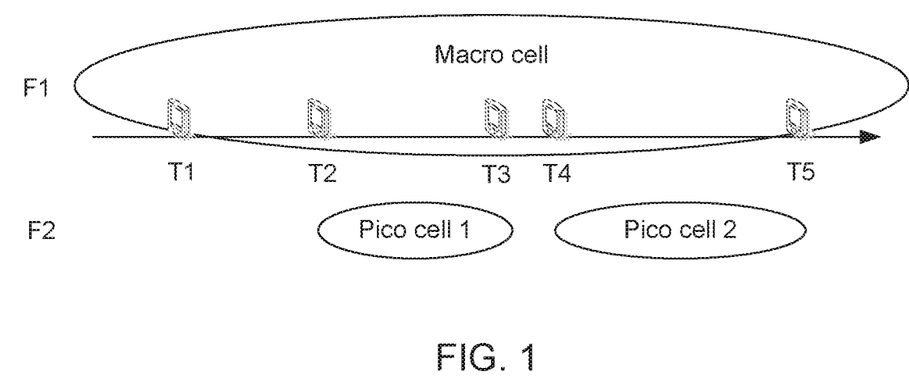
FIG. 1 illustrates a deployment scenario for inter evolved node B (eNB) carrier aggregation in accordance with an example.

FIG. 1 illustrates an example deployment scenario for inter evolved node B (eNB) carrier aggregation (CA). In general, inter-EUTRA eNB CA may reduce the amount of handover in the heterogeneous network. As shown in FIG. 1, a user equipment (UE) may travel within the macro cell. For example, at T1, the UE may be within coverage of the macro cell. At T2, the UE may add pico cell 1 because the UE is within coverage of pico cell 1. At T3, the UE may remove pico cell 1 because the UE is not within coverage of pico cell 1. At T4, the UE may add pico cell 2 because the UE is within coverage of pico cell 2. At T5, the UE may remove pico cell 2 because the UE is not within coverage of pico cell 2. Thus, at T5, the UE may only be within coverage of the macro cell.

Since the coverage of the macro cell is greater than coverage of the pico cell, the UE may be handed over to the macro cell or to another pico cell if the UE is only connected to the pico cell. On the other hand, if the UE is connected to the macro cell, then handover is not required, but offloading to the pico cell cannot be provided. Therefore, to achieve offloading and to avoid frequent handover, carrier aggregation may be used, i.e., the UE is served by both the macro cell and the pico cell. In one example, the primary cell can be associated with the macro cell and the secondary cell can be associated with the pico cell.

Since the primary cell is responsible for mobility management, the UE does not need to handover as long as the UE is moving within the macro cell. As shown in the example in FIG. 1, when the UE enters pico cell 1 or enters pico cell 2, handover may not be performed. In addition, the secondary cell associated with the pico cell may be used for data transmission and the UE may take advantage of offloading to the pico cell. Thus, the change from pico cell 1 to pico cell 2 (as shown in FIG. 1) can be supported with the additional/removal of the secondary cell instead of handover. While the macro cell and the pico cell are served by the different eNBs and connected via an X2 interface in inter-EUTRA eNB CA, all of the serving cells are served by the same eNB in 3GPP LTE Release 10 CA.

Figure 2:
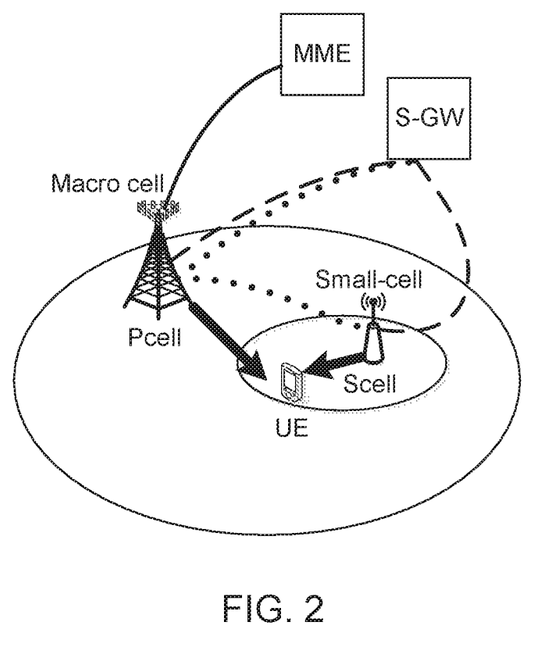
FIG. 2 illustrates an operating scheme for inter evolved node B (eNB) carrier aggregation in accordance with an example.

FIG. 2 illustrates an example operating scheme for inter evolved node B (eNB) carrier aggregation (CA). In inter-EUTRA eNB CA, the macro cell and the small cell (e.g., the pico cell) are served by different eNBs. The macro cell may be configured as the primary cell and is responsible for UE mobility management. Therefore, the macro cell may be connected with a mobility management entity (MME), as shown by the solid line in FIG. 2, whereas the small cell may be indirectly connected to the MME.

A radio bearer (RB) may be used to transfer data between the UE and the E-UTRAN. The RB may include a signaling radio bearer (SRB) and a data radio bearer (DRB). The SRB may be a radio bearer carrying Radio Resource Control (RRC) signaling messages. The DRB may be a radio bearer which transmits user data, as opposed to control plane signaling. The SRB in a control plane may be supported between the macro cell and the MME. The DRB in the user plane may be supported by two approaches. The first approach (as shown by the dashed line in FIG. 2) uses a new S1 bearer between the small cell and a serving gateway (S-GW). The second approach (as shown by the dotted line in FIG. 2) uses an X2 interface to forward the data to the S-GW. In the second approach, no new S1 bearer is needed between the small cell and the S-GW.

Figure 3:
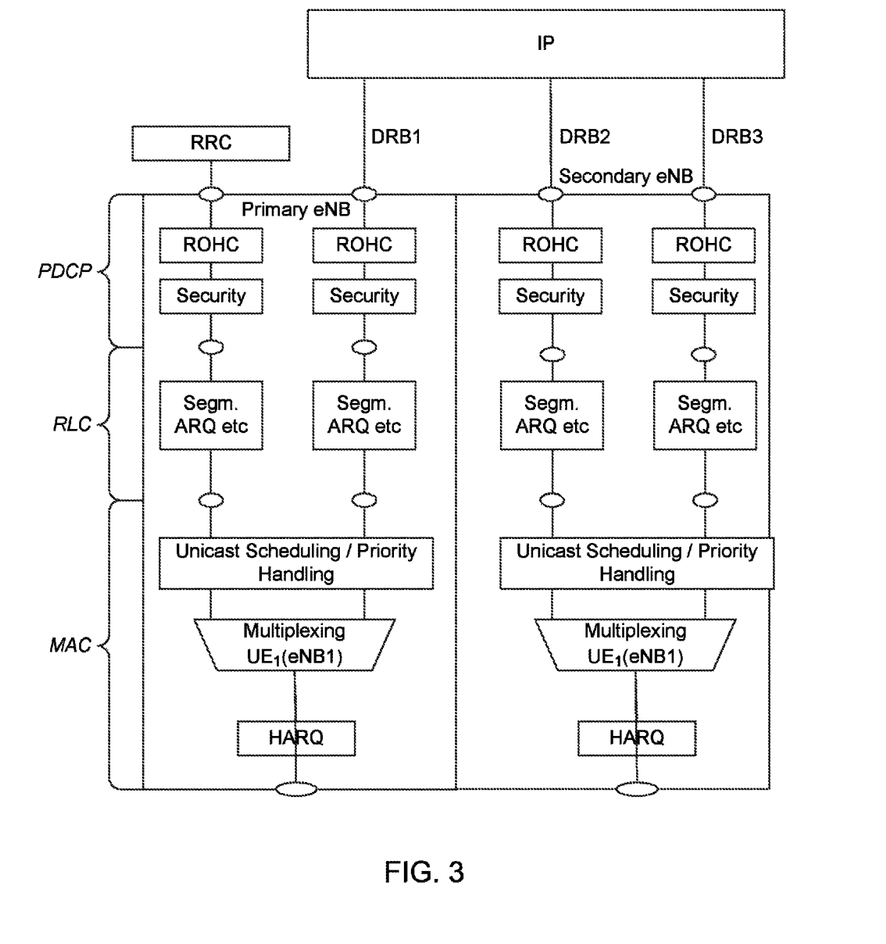
FIG. 3 illustrates a S1-based protocol for inter evolved node B (eNB) carrier aggregation in accordance with an example.

FIG. 3 illustrates an example S1-based protocol for inter evolved node B (eNB) carrier aggregation (CA). The S1-based protocol may include a packet data convergence protocol (PDCP) layer, Radio Link Control (RLC) layer, and a medium access control (MAC) layer. The DRB can be configured in either the macro cell or the small cell. As shown in FIG. 3, the SRBs and DRB 1 are configured in the macro cell and DRBs 2 and 3 are configured in the small cell. Since the S1 bearer is connected from the small cell to the S-GW directly, the physical layer (PHY), MAC, RLC, and PDCP for the DRBs 2 and 3 are located in the small cell.

The S1-based protocol may include the PDCP layer, which is the top sublayer of the LTE user plane layer 2 protocol stack. The PDCP layer processes Radio Resource Control (RRC) messages in the control plane and Internet Protocol (IP) packets in the user plane. Depending on the radio bearer, the main functions of the PDCP layer are header compression, security (integrity protection and ciphering), and support for reordering and retransmission during handover.

The S1-based protocol may include the RLC layer, which is located between the PDCP layer and the MAC layer in the LTE user plane protocol stack. The main functions of the RLC layer are segmentation and reassembly of upper layer packets in order to adapt the upper layer packets to a size appropriate for transmission over the radio interface. In addition, the RLC layer performs reordering to compensate for out-of-order reception due to Hybrid Automatic Repeat Request (HARQ) operation in the MAC layer.

The S1-based protocol may include the MAC layer, which is the protocol layer above the physical layer (PHY) and below the RLC layer in the LTE protocol stack. The MAC layer connects to the PHY through transport channels and connects to the RLC layer through logical channels. The MAC layer performs data transmission scheduling and multiplexing/demultiplexing between logical channels and transport channels.

In LTE, ciphering and integrity is used to protect data being received from a third party, or to detect changes made by the third party. In general, integrity refers to a receiver verifying that a received message is the same message as communicated by the transmitter/sender, whereas ciphering refers to the transmitter/sender encrypting the data with a security key that is known by the receiver. In the access stratum (AS) layer, ciphering and integrity are applied for RRC signaling data (i.e., control plane data) and only ciphering is applied for user data (i.e., user plane data or DRB data). The RRC layer is responsible for handling AS security keys and AS security procedure. In addition, the PDCP layer performs integrity and ciphering of the RRC signaling data, and ciphering of the user plane data.

A different security key is used for ciphering and integrity in the control plane and the data user plane. The security keys may include $K_{UPenc}$, $K_{RRCint}$, and $K_{RRCenc}$. $K_{UPenc}$ is a security key used for the protection of user plane traffic with a particular encryption algorithm. $K_{RRCint}$ is a security key used for the protection of RRC traffic with a particular integrity algorithm. $K_{RRCenc}$ is a security key used for the protection of RRC traffic with a particular encryption algorithm.

In general, the security keys $K_{UPenc}$, $K_{RRCint}$, and $K_{RRCenc}$. $K_{UPenc}$ may be generated from the security key $K_{eNB}$. For example, $K_{UPenc}$ and $K_{RRCenc}$ may be derived at a mobile equipment (ME) and the eNB from $K_{eNB}$, as well as an identifier for the encryption algorithm. $K_{RRCint}$ may be derived at the ME and the eNB from $K_{eNB}$, as well as an identifier for the integrity algorithm. In addition, the AS may derive the $K_{eNB}$ from a $K_{ASME}$, which is a common secret security key available in both the UE and the network.

In Release 10 CA, the primary cell is responsible to provide the security key ($K_{eNB}$). Since all serving cells are located in the same eNB in Release 10 CA, and the PDCP layer is defined per radio bearer (RB) regardless of the number of serving cells, a single security key may be used for carrier aggregation. However, in inter-EUTRA eNB CA, each eNB uses the security key to perform ciphering of data in the PDCP layer. As explained in further detail below, security key management may enable the eNBs to share the same security key, or alternatively, to use different security keys when performing ciphering of data in the PDCP layer.

Security key management may be performed in inter-EUTRA eNB CA if the PDCP layer of radio bearers (RBs) is located in the different eNBs. For example, the macro eNB may be associated with the macro cell and the small eNB (e.g., the pico eNB) may be associated with the small cell (e.g., the pico cell). Since the data radio bearer is configured in the small cell, user plane ciphering may be performed with the ciphering key $K_{UPenc}$. Alternatively, if the signaling radio bearer (SRB) is configured in the small cell, control plane ciphering and integrity may be performed with the ciphering keys $K_{RRCint}$ and $K_{RRCenc}$.

In one configuration, the small eNB may generate the same security key as used at the macro eNB. Thus, $K_{eNB}$ is provided to the small eNB for generating the same security key as used at the macro eNB. The small cell associated with the small eNB can be added as a secondary cell, and a newly dedicated radio bearer can be established for the small cell. As an example, a macro cell and a secondary cell may be used for carrier aggregation. An additional small cell may be added as an additional secondary cell. Therefore, the macro cell and two secondary cells may be used for carrier aggregation. The same security key may be shared between the three eNBs associated with the macro cell and the two secondary cells. In other words, the two small eNBs associated with the two secondary cells may generate the same security key as used by the macro eNB. In addition, a new dedicated radio bearer can be established for the additional secondary cell.

At least two approaches may be implemented when a small cell is added as a secondary cell and the new dedicated radio bearer is established for the small cell. In the first approach, the MME may communicate a S1 application protocol (S1AP) message to the small eNB. The S1AP message may configure an S1 bearer between the small eNB and the S-GW. The S1AP message may be directly communicated from the MME to the small eNB. Alternatively, the macro eNB may receive the S1AP message from the MME and forward the S1AP message to the small eNB. The MME may provide the security information ($K_{ASME}$) via the S1AP message during an S1 bearer setup procedure. The small eNB may determine the security key $K_{eNB}$ from $K_{ASME}$ in the access stratum (AS) level.

In the second approach, the macro eNB may communicate an X2 application protocol (X2AP) message to the small eNB. The X2AP message may contain instructions to add the small eNB as the secondary cell. The X2AP message may be communicated over an X2 interface. Thus, the macro eNB may provide $K_{eNB}$ (or $K_{UPenc}$) to the small eNB via the X2AP message for configuration of the secondary cell. Thus, the security key $K_{eNB}$ used at the small eNB is the same security key as used at the macro eNB.

Figure 4:
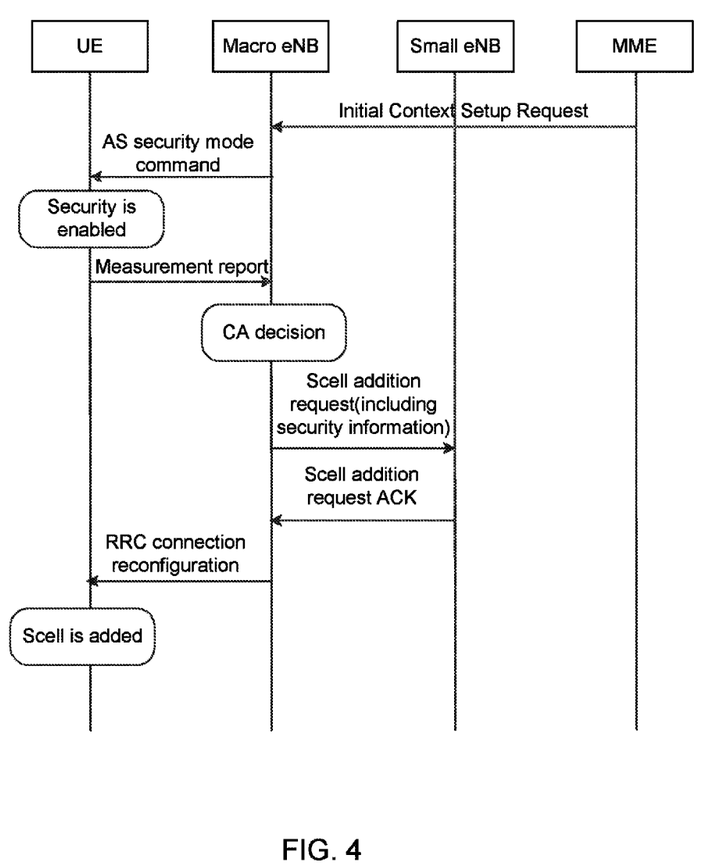
FIG. 4 illustrates a communication of security key information between a macro evolved node B (eNB) and a small eNB in accordance with an example.

FIG. 4 illustrates an exemplary communication of security key information between the macro eNB and the small eNB. In particular, FIG. 4 illustrates the macro eNB providing the security key $K_{eNB}$ to the small eNB over the X2 interface. The MME may communicate an initial context setup request message to the macro eNB. The macro eNB may communicate an AS security mode command message to the macro eNB. Security may be enabled, at the UE, in response to receiving the AS security mode command message. The UE may communicate a measurement report to the macro eNB. The macro eNB determines whether to perform carrier aggregation. The macro eNB may communicate a secondary cell addition request message to the small eNB. The secondary cell addition request message may be the X2AP message that is communicated over the X2 interface. In addition, the secondary cell addition request message may provide the security key $K_{eNB}$ (or $K_{UPenc}$) to the small eNB. Thus, the small cell may be configured with the security key $K_{eNB}$. The small eNB may communicate a secondary cell addition request acknowledgement (ACK) message to the macro eNB. The macro eNB may communicate a radio resource control (RRC) connection reconfiguration message to the user equipment (UE). The RRC connection reconfiguration message instructs the UE to add the secondary cell, so that the UE can receive data from the secondary cell (or small cell) and the macro cell.

In an alternative configuration, the small cell can be added as the secondary cell and an existing dedicated radio bearer can be reconfigured to be switched to the small cell. The existing dedicated radio bearer can be reconfigured in response to the small eNB generating the same security key as used at the macro eNB. In other words, path switching occurs from one small cell to another small cell (i.e., the new small cell). As an example, a macro cell and a first small cell may be used for carrier aggregation. A second small cell (e.g., a small cell that is different than the first small cell) may be added, such that the second small cell is used in conjunction with the first small cell and the macro cell for carrier aggregation. The second small cell may also be known as the new small cell. Thus, the eNB associated with the second small cell may generate the same security key as used at the eNB associated with the first small cell.

At least two approaches may be described when a small cell is added as a secondary cell and the existing dedicated radio bearer is reconfigured to be switched to the small cell. In the first approach, the macro eNB may communicate an X2AP message to the new small eNB. The X2AP message may contain the security key $K_{eNB}$ (or $K_{UPenc}$). In other words, the new small eNB may generate the same security key as used at the macro eNB.

In the second approach, a source small eNB (e.g., an old small eNB) may communicate the X2AP message to the new small eNB. The X2AP message may contain the security key $K_{eNB}$ (or $K_{UPenc}$). In other words, an interface between the source small eNB and the new small eNB may be used to communicate the X2AP message. Thus, the new small eNB may generate the same security key as used at the source small eNB.

If the same security key is used, there may be minimal impact on the UE that is performing ciphering, even if a new secondary cell is added and a new DRB is established. In addition, the macro eNB (or the small eNB) may not report the update of security information to the MME.

In one configuration, the macro eNB and the small eNB may use different security keys. For example, the small eNB may generate a security key that is different than the security key used at the macro eNB. In another example, a plurality of small eNBs used in conjunction with the macro eNB for carrier aggregation may each generate a security key that is different than the security keys used by the other small eNBs and the macro eNB.

In one configuration, the macro eNB may provide the security key $K_{eNB}*$ to the small eNB. The security key $K_{eNB}*$ may become the security key $K_{eNB}$ of the small cell. The macro eNB may generate the security key $K_{eNB}*$ using the security key $K_{eNB}$, a physical cell identity, and a EUTRA absolute radio frequency channel number downlink (EARFCN-DL) of the small cell. In general, the absolute radio frequency channel number (ARFCN) may define a pair of radio frequency (RF) channel frequencies for uplink and downlink use. Alternatively, the macro eNB may generate the security key $K_{eNB}*$ using a next hop (NH) parameter, as used for security key handling during handover. The macro eNB may provide the security key $K_{eNB}*$ to the small eNB, such that the macro eNB and the small eNB use different security keys.

FIG. 4 illustrates an exemplary communication of security key information (e.g., $K_{eNB}*$) between the macro eNB and the small eNB. The macro eNB may provide the security key $K_{eNB}*$ to the small eNB over the X2 interface. The macro eNB may determine to perform carrier aggregation. Subsequently, the macro eNB may communicate a secondary cell addition request message to the small eNB. The secondary cell addition request message may be the X2AP message that is communicated over the X2 interface. In addition, the secondary cell addition request message may provide security information, such as the security key $K_{eNB}*$ to the small eNB. Thus, the small eNB may use a different security key as compared to the macro eNB (e.g., the small eNB may use the security key $K_{eNB}*$ whereas the macro eNB may use the security key $K_{eNB}$).

Since the MME may store security key information used in the eNB and the UE, the macro eNB and/or the small eNB may notify the MME of updated security information. For example, the small eNB may notify the MME after receiving the different security key (e.g., $K_{eNB}*$) from the macro eNB. Alternatively, the macro eNB may notify the MME after sending the different security key (e.g., $K_{eNB}*$) to the small eNB.

As shown in FIG. 4, the macro eNB may communicate a secondary cell addition request message to the small eNB. In response, the small eNB may communicate a secondary cell addition request acknowledgement (ACK) message to the macro eNB. The secondary cell addition ACK message may include one or more security algorithm identifiers for the selected security algorithms. The security algorithm identifiers may be used to generate $K_{UPenc}$, $K_{RRCint}$, etc. using the security key $K_{eNB}$. In other words, the secondary cell (e.g., the small eNB) may send the security algorithm identifiers to the primary cell (e.g., the macro eNB). The macro eNB may communicate security information, such as the security algorithm identifiers, to the UE via the RRC connection reconfiguration message. In addition, the RRC connection reconfiguration message may contain instructions to add the small cell as the secondary cell. Thus, the UE may receive user data from the macro eNB in conjunction with the small eNB through carrier aggregation.

In one configuration, the UE may store and apply multiple security keys when multiple security keys are used in inter-EUTRA eNB CA. The UE may apply different security keys depending on the type of radio bearer. For example, $K_{eNB,1}$ is the security key for the macro eNB and $K_{eNB,2}$ is the security key for the small eNB. $K_{eNB,2}$ is the same security key as $K_{eNB}*$, which is provided to the small eNB from the macro eNB. Thus, $K_{eNB,1}$ is used for the signaling radio bearers (SRBs) and the data radio bearer (DRB) 1, which are configured in the macro cell. In addition, $K_{eNB,2}$ is used for DRB2 and DRB3, which are configured in the small cell.

In one configuration, a COUNT value may be used in integrity and ciphering in the PDCP layer. The COUNT value may include a hyper frame number (HFN) and a PDCP sequence number (SN). The HFN is a number which is incremented in relation to the PDCP sequence number. The HFN is included in the PDCP protocol data unit (PDU) counter for ciphering.

In one example, ciphering failure may occur when the COUNT value is desynchronized between the UE and the eNB due to data loss. Thus, the E-UTRAN may use a counter check procedure to minimize data loss, thereby reducing the likelihood of ciphering failure. The E-UTRAN may request the UE to verify the amount of data sent/received on each DRB. In particular, the UE may be requested to check if, for each DRB, the most significant bits of the COUNT correspond (or match) with the values indicated by the E-UTRAN. If the most significant bits of the COUNT value correspond to the values indicated by the E-UTRAN, then the COUNT value is not desynchronized (i.e., synchronized) between the UE and the eNB due to data loss.

In the counter check procedure, the eNB (e.g., a small eNB or a macro eNB) may communicate a Counter Check message to the UE. In one example, the Counter Check message may be included in a radio resource connection (RRC) message communicated to the UE. The Counter Check message may include a configured COUNT most significant bit (MSB) value. After receiving the Counter Check message, the UE may compare the configured COUNT MSB value with an actual COUNT MSB value. If the UE determines that the configured COUNT MSB value is the same as the actual COUNT MSB value, then the UE may communicate a Counter Check Response message to the eNB (e.g., a small eNB or a macro eNB). The Counter Check Response message may include the COUNT value for the requested DRB in the counter check procedure. In other words, the UE may verify that the amount of data on each DRB corresponds to a configured amount of data for each DRB.

There may be two approaches for the counter check procedure in inter-EUTRA eNB CA, depending on which eNB triggers the counter check procedure. In the first approach, the macro eNB may trigger the counter check procedure. The macro eNB may communicate the Counter Check message via the RRC message to the UE. The macro eNB may receive the Counter Check Response message from the UE. The Counter Check Response message may include the COUNT value of the DRB configured in the small cell. The macro eNB may communicate the COUNT value to the small eNB via an X2AP message. Alternatively, the macro eNB may not request a counter check for the DRB configured in the small eNB.

In the second approach, the small eNB may trigger the counter check procedure. The small eNB may desire to check the COUNT value for the DRB configured in the small cell. Thus, the small eNB may communicate a request for the COUNT value to the macro eNB via an X2AP message. The X2AP message may include the DRB index to be reported and the actual COUNT MSB values. The macro eNB may receive the request for the COUNT value in the X2AP message from the small eNB. The macro eNB may communicate the Counter Check message via the RRC message to the UE. The macro eNB may receive the Counter Check Response message from the UE. The Counter Check Response message may include the COUNT value of the DRB configured in the small cell. The macro eNB may communicate the COUNT value to the small eNB via an X2AP message.

Figure 5:
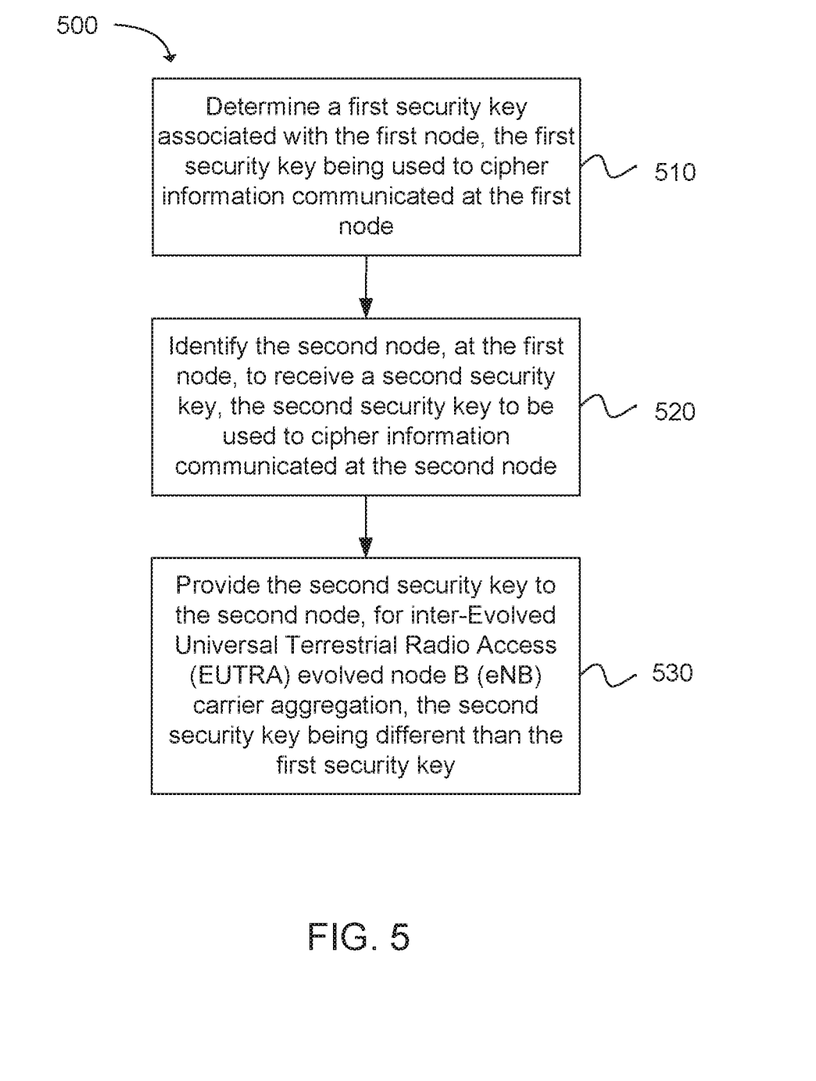
FIG. 5 depicts functionality of computer circuitry of a first node operable to communicate security key information to a second node in accordance with an example.

Another example provides functionality 500 of computer circuitry of a first node operable to communicate security key information to a second node, as shown in the flow chart in FIG. 5. The functionality may be implemented as a method or the functionality may be executed as instructions on a machine, where the instructions are included on at least one computer readable medium or one non-transitory machine readable storage medium. The computer circuitry can be configured to determine a first security key associated with the first node, the first security key being used to cipher information communicated at the first node, as in block 510. The computer circuitry can also be configured to identify the second node, at the first node, to receive a second security key, the second security key to be used to cipher information communicated at the second node, as in block 520. The computer circuitry can be further configured to provide the second security key to the second node, for inter-Evolved Universal Terrestrial Radio Access (EUTRA) evolved node B (eNB) carrier aggregation, the second security key being different than the first security key, as in block 530.

In one configuration, the computer circuitry can be further configured to provide the second security key to the second node in a secondary cell addition message. In one example, the first node can be configured to serve a primary cell and the second node can be configured to serve a secondary cell. In addition, the second security key can be generated at the first node using the first security key, a physical cell identity, and a EUTRA Absolute Radio Frequency Channel Number (EARFCN) of the secondary cell. Alternatively, the second security key can be generated using a Next Hop (NH) parameter.

In one configuration, the computer circuitry can be further configured to receive security key update information, at the first node from the second node, wherein the security key update information includes security algorithm identifiers. In addition, the computer circuitry can be further configured to provide the second security key to a user equipment (UE), wherein the UE communicates with the first node and the second node via inter-EUTRA eNB carrier aggregation using the first security key and the second security key, respectively.

In one example, the UE includes an antenna, a touch sensitive display screen, a speaker, a microphone, a graphics processor, an application processor, internal memory, or a non-volatile memory port. In addition, the first node and the second node are selected from a group consisting of a macro node, a base station (BS), a Node B (NB), an evolved Node B (eNB), a home eNB, a micro eNB, a baseband unit (BBU), a remote radio head (RRH), a pico node, a low power node, a remote radio equipment (RRE), or a remote radio unit (RRU).

Figure 6:
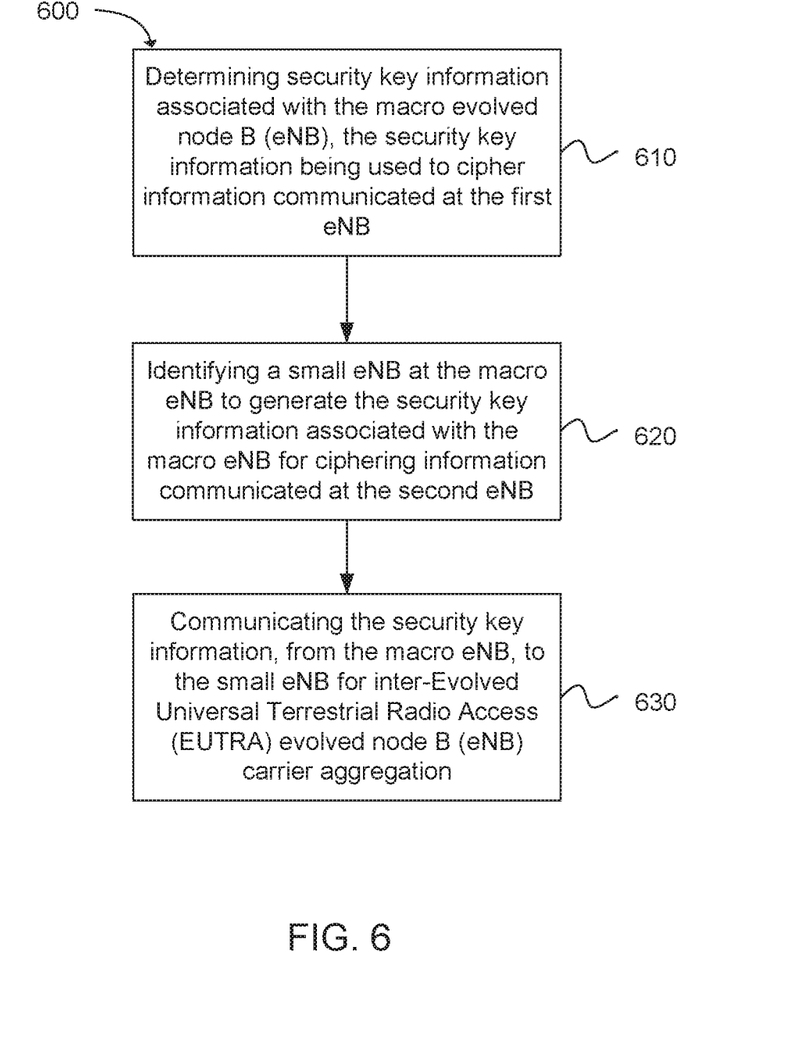
FIG. 6 depicts a flow chart of a method for communicating security key information from a macro eNB in accordance with an example.

Another example provides a method 600 for communicating security key information from a macro eNB, as shown in the flow chart in FIG. 6. The method may be executed as instructions on a machine, where the instructions are included on at least one computer readable medium or one non-transitory machine readable storage medium. The method includes the operation of determining security key information associated with the macro evolved node B (eNB), the security key information being used to cipher information communicated at the first eNB, as in block 610. The method can include identifying a small eNB at the macro eNB to generate the security key information associated with the macro eNB for ciphering information communicated at the second eNB, as in block 620. The next operation of the method can include communicating the security key information, from the macro eNB, to the small eNB for inter-Evolved Universal Terrestrial Radio Access (EUTRA) evolved node B (eNB) carrier aggregation, as in block 630.

In one example, the macro eNB can be configured to serve a primary cell and the small eNB can be configured to serve a secondary cell. In addition, the method can include communicating the security key information, from the macro eNB to the small eNB, via an X2 interface.

In one configuration, the method can include communicating the security key information to the small eNB in a secondary cell addition request X2 Application Protocol (X2AP) message via the X2 interface. In addition, the method can include communicating the security key information, from the small eNB to a new small eNB associated with a UE for inter-EUTRA eNB carrier aggregation. In one example, the method can include receiving, at the macro eNB from a mobility management entity (MME), a S1 application protocol (S1AP) message, the S1AP including the security key information associated with the macro eNB; and communicating the security key information via the S1AP message to the small eNB, from the macro eNB, the small eNB using the security key information to cipher information communicated at the small eNB.

In one configuration, the method can include communicating the security key information to a user equipment (UE), from the macro eNB, the UE using the security key information to communicate with the macro eNB and the small eNB via inter-EUTRA eNB carrier aggregation using the first security key and the second security key, respectively.

Figure 7:
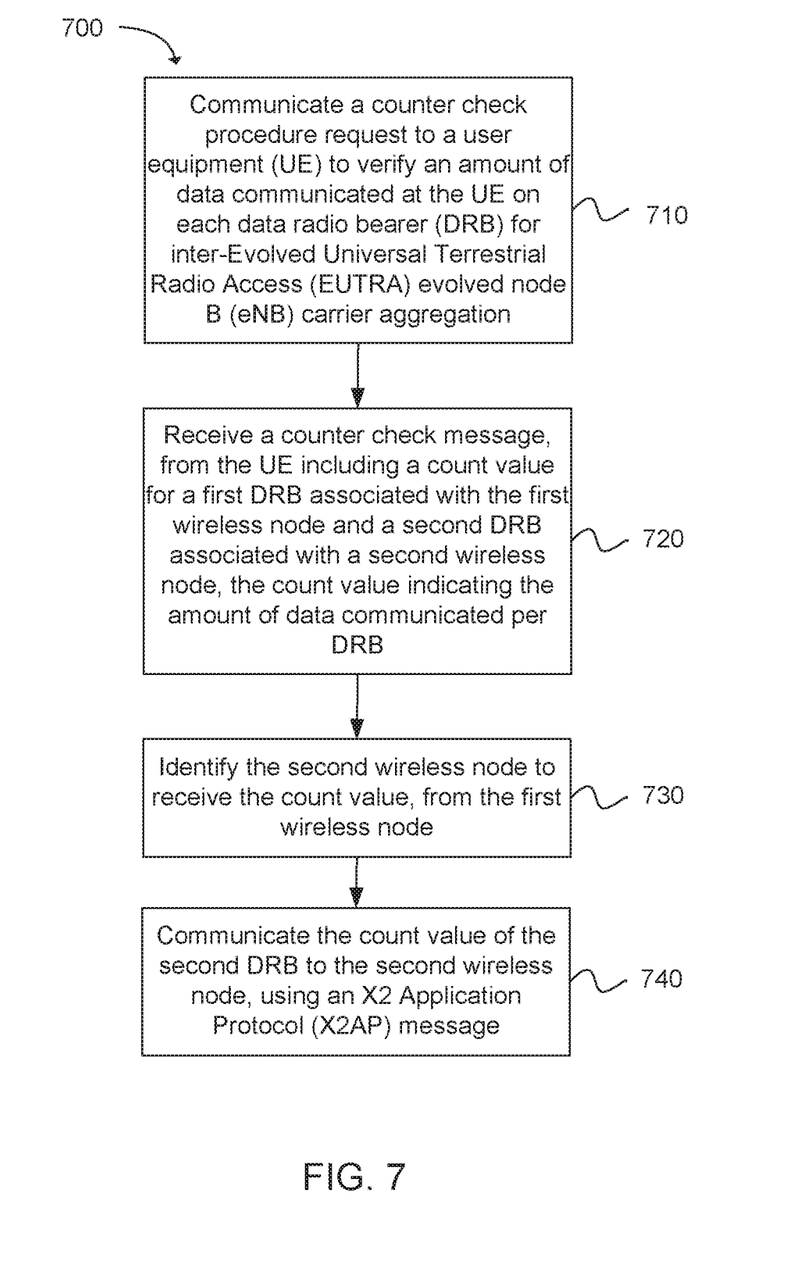
FIG. 7 depicts functionality of computer circuitry of a first wireless node operable to communicate integrity and ciphering information in accordance with an example.

Another example provides functionality 700 of computer circuitry of a first wireless node operable to communicate integrity and ciphering information, as shown in the flow chart in FIG. 7. The functionality may be implemented as a method or the functionality may be executed as instructions on a machine, where the instructions are included on at least one computer readable medium or one non-transitory machine readable storage medium. The computer circuitry can be configured to communicate a counter check procedure request to a user equipment (UE) to verify an amount of data communicated at the UE on each data radio bearer (DRB) for inter-Evolved Universal Terrestrial Radio Access (EUTRA) evolved node B (eNB) carrier aggregation, as in block 710. The computer circuitry can also be configured to receive a counter check message, from the UE including a count value for a first DRB associated with the first wireless node and a second DRB associated with a second wireless node, the count value indicating the amount of data communicated per DRB, as in block 720. The computer circuitry can be further configured to identify the second wireless node to receive the count value, from the first wireless node, as in block 730. In addition, the computer circuitry can be configured to communicate the count value of the second DRB to the second wireless node, using an X2 Application Protocol (X2AP) message, as in block 740.

In one example, the count value includes a hyper frame number (HFN) and a packet data convergence protocol (PDCP) sequence number. In one configuration, the computer circuitry can be configured to receive a request, from the second wireless node, for a count value associated with the second DRB, communicate a radio resource connection (RRC) message, to the UE, requesting that the UE communicate the count value to the first wireless node, receive the count check message from the UE, the count check message including the count value, and communicate the count value, to the second wireless node, using the X2AP message. In addition, the first wireless node can be a macro node and the second wireless node can be a small node.

Figure 8:
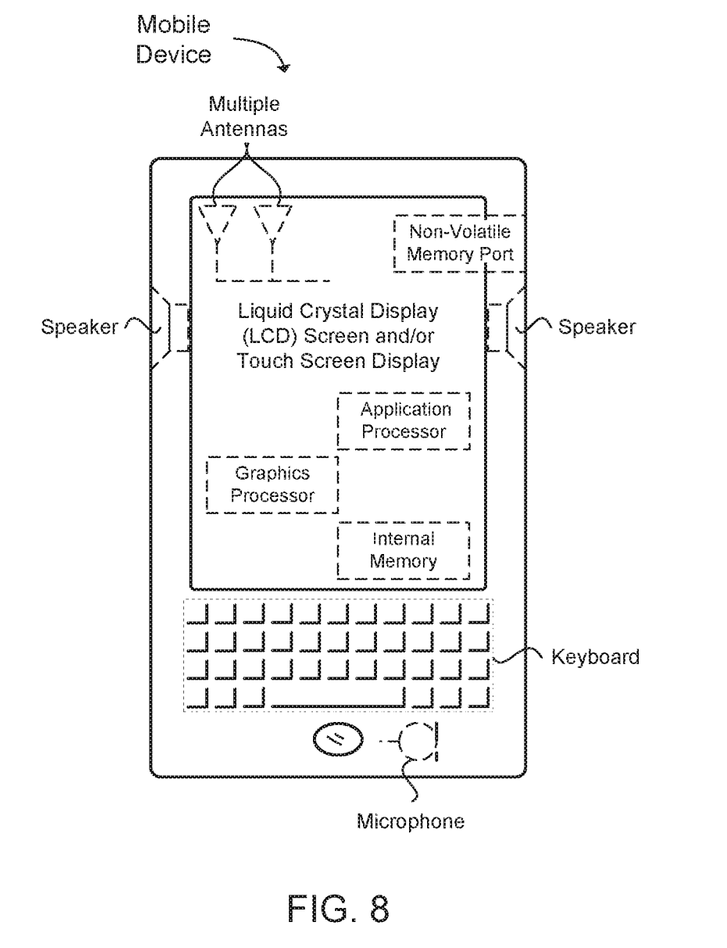
FIG. 8 illustrates a diagram of a wireless device (e.g., UE) in accordance with an example.

FIG. 8 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A master evolved node B (MeNB) operable to support dual connectivity, the MeNB comprising one or more processors and memory configured to:
   process, at the MeNB, a secondary evolved node B (SeNB) counter check request message received from the SeNB; and
   execute, at the MeNB, a counter check procedure in response to the SeNB counter check request message received from the SeNB, wherein the counter check procedure causes the MeNB to transmit one or more radio resource control (RRC) messages to a user equipment (UE) to verify a COUNT value for bearers established in the SeNB.

2. The MeNB of claim 1, further comprising a transceiver at the MeNB that is configured to receive the SeNB counter check request message from the SeNB.

3. The MeNB of claim 1, wherein the one or more processors and memory are further configured to: process, at the MeNB, security key information for transmission to a user equipment (UE), wherein the security key information is associated with the SeNB.

4. The MeNB of claim 1, wherein the SeNB counter check request message is an X2 Application Protocol (X2AP) message.

5. The MeNB of claim 1, wherein the COUNT value is a packet data convergence protocol (PDCP) COUNT value.

6. The MeNB of claim 1, wherein the one or more processors and memory are further configured to: perform an RRC counter check procedure with the UE in response to receiving the SeNB counter check request message from the SeNB.

7. At least one non-transitory machine readable storage medium having instructions embodied thereon for supporting dual connectivity at a master evolved node B (MeNB), the instructions when executed perform the following:
   processing, using at least one processor of the MeNB, a secondary evolved node B (SeNB) counter check request message received from the SeNB; and
   executing, using the at least one processor of the MeNB, a counter check procedure in response to the SeNB counter check request message received from the SeNB, wherein the counter check procedure causes the MeNB to transmit one or more radio resource control (RRC) messages to a user equipment (UE) to verify a COUNT value for bearers established in the SeNB.

8. The at least one non-transitory machine readable storage medium of claim 7, further comprising instructions when executed perform the following: processing, at the MeNB, security key information for transmission to a user equipment (UE), wherein the security key information is associated with the SeNB.

9. The at least one non-transitory machine readable storage medium of claim 7, wherein the SeNB counter check request message is an X2 Application Protocol (X2AP) message.

10. The at least one non-transitory machine readable storage medium of claim 7, wherein the COUNT value is a packet data convergence protocol (PDCP) COUNT value.

11. The at least one non-transitory machine readable storage medium of claim 7, further comprising instructions when executed perform the following: performing an RRC counter check procedure with the UE in response to receiving the SeNB counter check request message from the SeNB.

* * * * *